United States Patent [19]

Grigo et al.

[11] 4,232,132
[45] Nov. 4, 1980

[54] ELASTOMERIC THERMOPLASTIC MIXTURES OF POLYPROPYLENE AND ETHYLENE/VINYL ACETATE COPOLYMERS

[75] Inventors: Ulrich Grigo, Krefeld; Josef Merten, Korschenbroich; Rudolf Binsack, Krefeld, all of Fed. Rep. of Germany

[73] Assignee: Bayer Aktiengesellschaft, Fed. Rep. of Germany

[21] Appl. No.: 19,788

[22] Filed: Mar. 12, 1979

[30] Foreign Application Priority Data

Mar. 16, 1978 [DE] Fed. Rep. of Germany ....... 2811550

[51] Int. Cl.$^2$ ...................... C08L 23/12; C08L 31/04
[52] U.S. Cl. ..................................... 525/222; 525/192
[58] Field of Search .................. 260/897 A; 525/222, 525/192

[56] References Cited

U.S. PATENT DOCUMENTS

| 3,218,373 | 11/1965 | Salyer | 260/878 |
| 3,433,573 | 3/1969 | Holladay et al. | 8/55 |
| 4,116,914 | 9/1978 | Coran et al. | 260/30.6 R |

Primary Examiner—Carman J. Seccuro
Attorney, Agent, or Firm—Connolly and Hutz

[57] ABSTRACT

An elastomeric thermoplastic mixture comprising (A) from 40 to 95% by weight of polypropylene, and (B) from 5 to 60% by weight of a partially cross-linked ethylene/vinyl acetate copolymer which has a gel content of from 3 to 50% by weight and a vinyl acetate content of from 20 to 80% by weight, the percentages being based on the sum of A+B.

6 Claims, No Drawings

ELASTOMERIC THERMOPLASTIC MIXTURES OF POLYPROPYLENE AND ETHYLENE/VINYL ACETATE COPOLYMERS

This invention relates to elastomeric thermoplastic mixtures of polypropylene and a partially crosslinked ethylene/vinyl acetate copolymer (EVA).

Mixtures of polypropylene and ethylene/vinyl acetate copolymers are known.

Thus, German Offenlegungsschrift No. 1,811,799 describes mixtures of polypropylene and partially hydrolysed ethylene/vinyl acetate copolymers, whilst German Offenlegungsschrift No. 2,116,760 describes mixtures of polypropylene grafted with rubber and ethylene/propylene or ethylene/vinyl acetate copolymers.

Mixtures of polypropylene and ethylene/vinyl acetate copolymers are known from Japanese Applications or Pat. Nos. 24 533-68, 13 058-65 and 8068-64, from French Pat. Nos. 1,316,788 and 1,321,201 and from Belgian Pat. No. 631,029.

The mixtures of polypropylene and uncrosslinked ethylene/vinyl acetate copolymers described in these Patents have unsatisfactory elastic properties, for example permanent elongation and notched impact strength.

It has surprisingly been found that, by using partially crosslinked ethylene/vinyl acetate copolymers with gel contents of from 3 to 50% by weight in admixture with isotactic polypropylene, it is possible to obtain improvements in elastic properties, particularly notched impact strength and permanent elongation, over comparison mixtures containing uncrosslinked ethylene/vinyl acetate copolymers. Ethylene/vinyl acetate copolymers having gel contents of from 5 to 40% by weight have proved to be particularly suitable.

The present invention provides elastomeric thermoplastic mixtures of (A) from 40 to 95% by weight of polypropylene, and
(B) from 5 to 60% by weight of a partially crosslinked ethylene/vinyl acetate copolymer (EVA) having a gel content of from 3 to 50% by weight.

In addition to the advantages mentioned above, the mixtures according to the invention also show improved mould-release properties by comparison with mixtures containing uncrosslinked ethylene/vinyl acetate copolymer.

Before crosslinking, the ethylene/vinyl acetate copolymers used in accordance with the invention have Mooney viscosities of from 10 to 50 (ML$_{4+1}$, 100° C.), a density of from 0.93 to 1.2 g/cc and a gel content of less than 3% by weight. The vinyl acetate content of the copolymer is from 20 to 80% by weight, preferably from 25 to 60% by weight and, with particular preference, from 30 to 50% by weight. The vinyl acetate monomers in the copolymer are in general statistically distributed. The copolymers have a heat of fusion of less than 15 cal/g. The ethylene/vinyl acetate copolymers may be produced by known processes (H. Streib et al., Kunststoffe 67 (1977/3).

The Mooney viscosities of the ethylene/vinyl acetate copolymers can be increased by two to three times by crosslinking.

Partial crosslinking of the ethylene/vinyl acetate copolymers may be carried out with any vulcanizing agent which forms free radicals, such as for example organic aromatic or aliphatic peroxides, for example aromatic diacyl peroxides and aliphatic diacyl peroxides, peroxides of dibasic acids, ketone peroxides, alkyl peroxy esters, alkyl hydroperoxides, such as diacetyl peroxide, dibenzoyl peroxide, bis-2,4-dichlorobenzoyl peroxide, di-tert.-butyl peroxide, dicumyl peroxide, tert.-butyl perbenzoate, tert.-butyl cumyl peroxide, 2,5-bis-(tert.-butyl-peroxy)-2,5-dimethyl cyclohexane, 1,3-bis-(tert.-butyl-peroxyisopropyl)-benzene, lauryl peroxide, succinic acid peroxide, cyclohexanone peroxide, tert.-butyl peroctoate and tert.-butyl hydroperoxide.

Azides such as azido formates and aromatic polyazides may also be used as vulcanising agents.

Organic peroxides having half-life periods of more than 10 minutes at 100° C. have proved to be particularly suitable.

Partial crosslinking of the ethylene/vinyl acetate copolymers is carried out in bulk (mixing rolls, internal mixers, extruders). It is important for partial crosslinking of the ethylene/vinyl acetate copolymer to be carried out before admixture with the polyolefin in order to prevent the polyolefin from being degraded by the peroxide.

The crosslinking conditions (type of ethylene/vinyl acetate copolymer, type and quantity of crosslinking agent, crosslinking time and temperature) are selected in such a way that the gel content of the ethylene/vinyl acetate copolymer does not exceed 50% by weight in order to obtain optimum improvements in elastic properties, particularly permanent elongation and notched impact strength, in mixtures with polypropylene. The optimal values for the above-mentioned parameters may readily be determined by preliminary tests. The degree of crosslinking is best determined by measuring the gel content in chlorobenzene.

For crosslinking in bulk, it is important for the crosslinking agent to be homogeneously distributed before the actual crosslinking reaction in order to avoid local overcrosslinking during the subsequent crosslinking process. Precrosslinking in bulk is obtained for example by kneading or rolling the ethylene/vinyl acetate copolymer for between 5 and 10 minutes at temperatures in the range of from 80° to 240° C. Where the above-mentioned crosslinking agents are used, the kneading time and temperature are largely determined by their half-life period.

The partially vulcanised copolymer is a thermoplastically processible material which may be rolled to form a continuous sheet or band. This sheet may optionally be cut up and granulated.

The polypropylene in the mixture has a density of from about 0.90 to 0.92 g/m$^3$ and a melt index (IMI) of from 3 to 20 g/10 min. at 230° C. under a load of 5 kg. The polypropylene should be more than 90% isotactic.

The mixtures according to the invention contain from 5 to 60% by weight of partially crosslinked ethylene/vinyl acetate copolymer (EVA) and from 40% to 95% by weight of polyolefin. Mixtures containing from 10% to 45% by weight of partially crosslinked EVA and from 55% to 90% by weight of polyolefin have proved to be particularly suitable.

Mixing of the partially crosslinked ethylene/vinyl acetate copolymer with the polyolefin may be carried out in any suitable conventional manner, for example on mixing rolls, in an internal mixer or in an extruder. The mixing temperature should be high enough to soften or melt the plastic and to form a uniform mixture.

If desired, pigments, fillers, stabilisers, lubricants, light stabilisers or other suitable additives or modifying ingredients may be incorporated in the mixture. The mixtures according to the invention represent a remarkable combination of processibility (including the ability to be repeatedly processed) with good physical properties, above all elastic properties. Compared with corresponding mixtures containing uncrosslinked ethylene/-vinyl acetate copolymers, the mixtures according to the invention show a pronounced improvement in elastic properties, such as permanent elongation and notched impact strength.

The thermoplastic polymer mixtures according to the invention are suitable, for example, for the production of automobile components, such as bumpers, instrument panels, internal trim and mouldings.

EXAMPLES 1–4 and COMPARISON EXAMPLES I AND II

Two ethylene/vinyl acetate copolymers differing in their vinyl acetate content were used, namely:

EVA 45 containing 45% by weight of vinyl acetate, and

EVA 33 containing 33% by weight of vinyl acetate.

The polypropylene used had a molecular weight ($M_w$) of approximately 300,000, a melt index (IMI) of 7 g/10 mins at 230° C. under a load of 5 kg and was 95% isotactic.

The ethylene/vinyl acetate copolymer was partially crosslinked with an organic peroxide having a half-life period of 10 minutes at 160° C. in an internal kneader.

The mass temperatures were between 120° and 200° C. The necessary quantity of peroxide was determined by preliminary tests. The kneaded product was rolled out to form a sheet (roll temperature: 80°–100° C.) and subsequently size-reduced.

The mixtures of partially crosslinked EVA 45 or EVA 33 and polypropylene were produced at a mass temperature of 230° to 250° C.

The mixture obtained was cooled and subsequently granulated.

The test specimens (number 3 according to DIN 53 504) were produced in an injection moulding machine at 230° C. The test specimens required for the various tests were mechanically produced from the number 3 tests specimen.

In Examples 1 to 3, in which polypropylene was mixed with partially crosslinked EVA 45 having different gel contents, notched impact strength and permanent elongation are improved in relation to Comparison Example I using uncrosslinked EVA 45. Improvements of similar magnitude are also obtained in the properties of mixtures of polypropylene with partially cross-linked EVA 33. In all Examples, the Vicat temperature (dimensional stability under heat) is only slightly reduced, if at all, by partial crosslinking (see Table).

The gel contents of the partially crosslinked ethylene/vinyl acetate copolymers are determined in known manner on solutions in chlorobenzene, cyclohexane or toluene.

TABLE

| Composition | Test specification | Examples | | | |
|---|---|---|---|---|---|
| | | 1 | 2 | 3 | 4 |
| Polypropylene | parts by weight | 80 | 80 | 80 | 80 |
| EVA 45 | parts by weight | 20 | 20 | 20 | — |
| EVA 33 | parts by weight | — | — | — | 20 |
| Gel content of the EVA | % by weight | 18 | 31 | 48 | 27 |
| Test Methods | | | | | |
| Permanent % elongation | * | 78 | 80 | 83 | 82 |
| Vicat temperature (VST/A) | °C. DIN 53 640 | 141 | 142 | 140 | 143 |
| Notched impact strength $a_k$ at 20° C. | kJ/m$^2$ DIN 53 453 | 28.7 | 26.5 | 18.0 | 24.6 |

| Composition | | Comparison Examples | |
|---|---|---|---|
| | | I | II |
| Polypropylene | parts by weight | 80 | 80 |
| EVA 45 | parts by weight | 20 | — |
| EVA 33 | parts by weight | — | 20 |
| Gel content of the EVA | % by weight | — | — |
| Test Methods | | | |
| Permanent elongation | % | 86.5 | 87 |
| Vicat temperature (VST/A) | °C. | 142 | 144 |
| Notched impact strength $a_k$ at 20° C. | kJ/m$^2$ | 15.2 | 14.9 |

* determined in the tensile test according to DIN 53 455.

We claim:

1. An elastomeric thermoplastic mixture consisting of
   (A) from 40 to 95% by weight of polypropylene which is greater than 90% isotactic and
   (B) from 5 to 60% by weight of an ethylene/vinyl acetate copolymer having a vinyl acetate content of from 20 to 80% by weight, said copolymer having been partially cross-linked to a gel content of 3 to 50% by weight before admixture with said polypropylene.

2. An elastomeric thermoplastic mixture as claimed in claim 1, wherein the ethylene/vinyl acetate copolymer has a gel content of from 5 to 40% by weight.

3. An elastomeric thermoplastic mixture as claimed in claim 1, wherein the ethylene/vinyl acetate copolymer contains from 25 to 60% by weight of vinyl acetate.

4. An elastomeric thermoplastic mixture as claimed in claim 1, comprising:
   (A) from 55 to 90% by weight of polypropylene, and
   (B) from 10 to 45% by weight of the partially cross-linked ethylene/vinyl acetate copolymer.

5. An elastomeric thermoplastic mixture as claimed in claim 1, wherein the polypropylene has a melt index (IMI) of from 3 to 20 g/10 min. at 230° C. under a load of 5 kg.

6. An elastomeric thermoplastic mixture as claimed in claim 1, wherein the ethylene/vinyl acetate copolymer has been partially crosslinked in the presence, as a crosslinking agent, of an organic peroxide having a half-life period of more than 10 min. at 100° C.

* * * * *